US010817390B2

(12) United States Patent
Shah et al.

(10) Patent No.: US 10,817,390 B2
(45) Date of Patent: Oct. 27, 2020

(54) IMPARTING DURABILITY TO A TRANSACTIONAL MEMORY SYSTEM

(75) Inventors: Mehul A. Shah, Saratoga, CA (US); Stavros Hartzopoulos, San Francisco, CA (US); Arif A. Merchant, Los Altos, CA (US); Mohit Saxena, Madison, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 920 days.

(21) Appl. No.: 14/343,010

(22) PCT Filed: Sep. 14, 2011

(86) PCT No.: PCT/US2011/051516
§ 371 (c)(1),
(2), (4) Date: Mar. 5, 2014

(87) PCT Pub. No.: WO2013/039494
PCT Pub. Date: Mar. 21, 2013

(65) Prior Publication Data
US 2014/0237172 A1 Aug. 21, 2014

(51) Int. Cl.
*G06F 11/14* (2006.01)
*G06F 9/46* (2006.01)
*G06F 12/02* (2006.01)

(52) U.S. Cl.
CPC .......... *G06F 11/1474* (2013.01); *G06F 9/467* (2013.01); *G06F 12/0246* (2013.01); *G06F 2212/205* (2013.01)

(58) Field of Classification Search
CPC .......... G06F 9/466; G06F 9/528; G06F 9/467; G06F 12/0246; G06F 11/1474
See application file for complete search history.

(56) References Cited

U.S. PATENT DOCUMENTS

| 5,913,219 A | 1/1999 | Baek et al. |
| 7,636,829 B2 | 12/2009 | Hertzberg et al. |
| 8,806,096 B1* | 8/2014 | Patil ...................... G06F 3/0689 710/74 |
| 9,298,469 B2* | 3/2016 | Busaba .................... G06F 9/44 |
| 2004/0064635 A1 | 4/2004 | Im-Young et al. |
| 2007/0011416 A1 | 1/2007 | Lee |
| 2008/0126755 A1* | 5/2008 | Wu .......................... G06F 9/524 712/220 |
| 2009/0150599 A1 | 6/2009 | Bennett |
| 2009/0182956 A1 | 7/2009 | Caprioli et al. |

(Continued)

FOREIGN PATENT DOCUMENTS

| KR | 10-0204027 | 6/1999 |
| KR | 10-2007-0006502 | 8/2007 |

OTHER PUBLICATIONS

Satyanarayanan et al. "Lightweight Recoverable Virtual Memory." 1993. ACM. SIGOPS '93. pp. 146-160.*

(Continued)

*Primary Examiner* — Nathan Sadler (57) ABSTRACT

A transactional memory system uses a volatile memory as primary storage for transactions. Data is selectively stored in a non-volatile memory to impart durability to the transactional memory system to allow the transactional memory system to be restored to a consistent state in the event of data loss to the volatile memory.

17 Claims, 5 Drawing Sheets

(56) References Cited

U.S. PATENT DOCUMENTS

| | | |
|---|---|---|
| 2009/0193193 A1 | 7/2009 | Kern |
| 2009/0217018 A1 | 8/2009 | Abrashkevich et al. |
| 2010/0100689 A1 | 4/2010 | Dadiomov et al. |
| 2010/0241676 A1 | 9/2010 | Rathi |
| 2011/0072207 A1 | 3/2011 | Jin et al. |
| 2011/0219208 A1* | 9/2011 | Asaad .................... G06F 15/76 712/12 |

OTHER PUBLICATIONS

Russel Kay. "Flash Memory." Jun. 2010. Computerworld. https://www.computerworld.com/article/2550624/flash-memory.html.*
Saxena et al. "Hathi: Durable Transactions for Memory using Flash." May 2012. ACM. DaMoN 2012. pp. 33-38.*
Jeffrey L. Eppinger. Virtual Memory Management for Transaction Processing Systems. Feb. 1998. Carnegie Mellon University. CMU-CS-89-115. PhD Thesis.*
PCT Search Report/Written Opinion—Application No. PCT/US2011/051516, dated Apr. 27, 2012. 9 pages.
Qin Xiongpai, Zhou Xiaoyun, "Performance Study on Logging to Another Main Memory Database," IEEE Explore, Abstract. Oct. 5, 2011.

\* cited by examiner

IMPARTING DURABILITY TO A TRANSACTIONAL MEMORY SYSTEM

BACKGROUND

A transactional memory system allows application programmers to safely and easily scale their programs across many processors or processing cores. In a typical transactional memory system, multiple application threads share a volatile memory, such as a dynamic random access memory (DRAM), while isolation is provided among the threads for accessing the volatile memory. A transactional memory system typically is faster than a traditional transactional database system that employs the use of mass storage that has relatively slow access times, such as magnetic storage, rotating disks, tape drives, etc.

DETAILED DESCRIPTION

Systems and techniques are disclosed herein for purposes of imparting durability to a transactional memory system, which relies on a volatile memory (a dynamic random access memory (DRAM), for example) as its primary storage. In this context, a "transactional memory system" is a system that allows multiple processing entities (threads, for example) to share a memory while providing isolation among the threads for accesses to the memory. The transactional memory system allows a given processing entity to perform a transaction that logically appears to the other processing entities to occur at a single point in time, while in reality the transaction may involve a sequence of write operations, read operations and interspersed computations by the given processing entity.

As a non-limiting example, a given processing entity may perform a transaction for purposes of modifying a data structure in the memory, which involves reading parameters of the structure, modifying parameters of the structure and writing back resulting modified parameters to the memory. The transactional memory system regulates the transactions so that a single transaction at a time occurs with the memory, although, as noted above, the transaction may involve multiple memory operations, and some of these memory operations may occur in parallel with the memory. The results of a given transaction for a given processing entity become visible to the other processing entities after the transactional memory system commits the transaction to the memory.

The transactional memory system may either be software-based (e.g., implemented using software that operates with the operating system, software that is part of the operating system, software entirely separate from the operation system) or hardware-based (e.g. implemented using hardware inside a microprocessor, as a non-limiting example), depending on the particular implementation.

Figure 1:
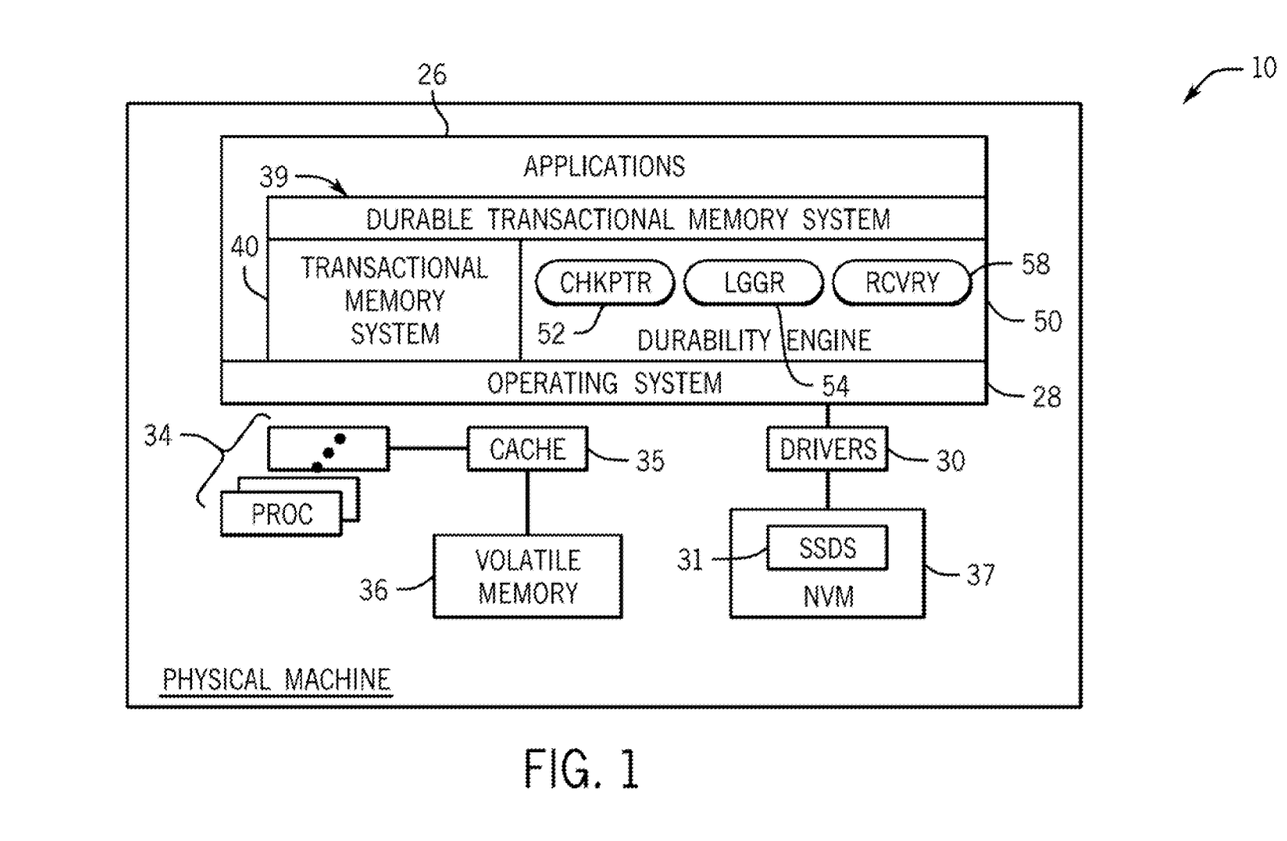
FIG. 1 is a layer diagram of a physical machine according to an example implementation.

Regardless of its particular form, the transactional memory system instills the properties of atomicity, consistency and isolation for the transactions. Referring to FIG. 1, in accordance with example implementations disclosed herein, a durable transactional memory system 39 includes a transactional memory system 40 (which may be a software or hardware transactional memory system) that has these three properties and a transaction durability engine 50, which imparts the additional property of durability for the transactions, even though the transactional memory system 39 relies on a volatile memory 36 as primary storage for the transactions. As further described below, although the volatile memory 36 is potentially subject to an event (an event in which power to the volatile memory 36 is lost, for example) that may erase or undesirably alter the contents of the volatile memory 36, the transaction durability engine 50 selectively stores data in a non-volatile memory 37 to ensure that a consistent state of the transactional memory system 40 may be recovered if such an event occurs.

As depicted in FIG. 1, in accordance with some example implementations, the durable transactional memory system 39, volatile memory 36 and non-volatile memory 37 may be part of a physical machine 10. In this context, a "physical machine" indicates that the machine is an actual machine made up of executable program Instructions and hardware. Examples of physical machines include computers (e.g., application servers, storage servers, web servers, etc.), communications modules (e.g., switches, routers, etc.) and other types of machines. The physical machine 10 may be located within one cabinet (or rack); or alternatively, the physical machine 10 may be located in multiple cabinets (or racks).

The physical machine 10 may be implemented in an application server, a storage server farm (or storage area network), a web server farm, a switch or router farm, other type of data center, and so forth. Also, although the physical machine 10 is depicted in FIG. 1 as being contained within a box, it is noted that the physical machine 10 may be a distributed machine having multiple nodes, which provide a distributed and parallel processing system.

In accordance with a specific example described herein, the physical machine 10 contains machine executable instructions, which are executed by hardware of the machine 10, such as one or multiple processors 34. In general, the processors 34 may be one or multiple central processing units (CPUs) and/or may be one or multiple processing cores 34 of one or more CPUs.

As a non-limiting example of the machine executable instructions, the physical machine 10 may contain a set of instructions that form an operating system 28, as well as sets of machine executable instructions that when executed form respective applications 26 and drivers 30. In accordance with other example implementations, the physical machine 10 may not include the operating system 28 and/or may not include the drivers 30. In accordance with an example implementation, a set of machine executable instructions may when executed form the transactional memory system 40 and a set of machine executable instructions may when executed form the durable transactional memory system 39, including the durability engine 50 and transactional memory system 40, although any of these components may be implemented in hardware in accordance with other example implementations.

Among its other features, the physical machine 10 may include additional hardware, such as at least one cache 35 as well as solid state drives (SSDs) 31 that are operated via one or more of the drivers 30 and collectively form the non-volatile memory 37, in accordance with some example implementations. As a non-limiting example, a given SSD 31 may contain NAND flash memory, although the SSD 31 may store data in other non-volatile storage mediums, such as phase change memory (PCM) or memristor memory, in accordance with other example implementations.

Figure 2:
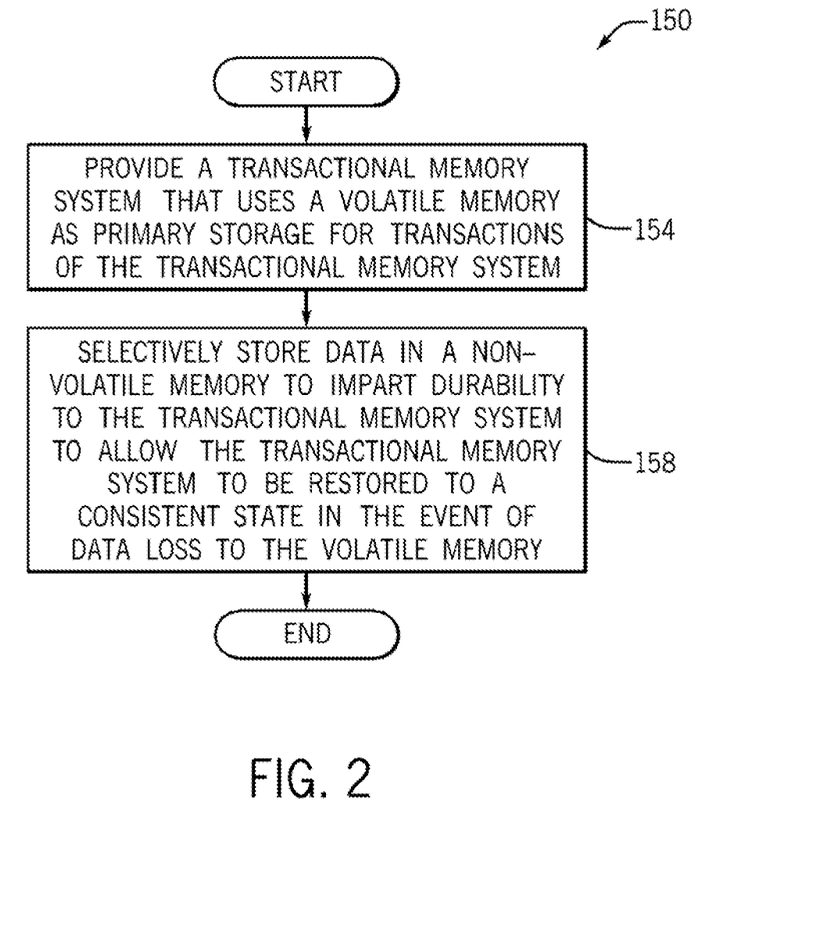
FIG. 2 is a flow diagram depicting a technique to impart durability to a transactional memory system according to an example implementation.

Referring to FIG. 2 in conjunction with FIG. 1, to summarize, the transaction durability engine 50, when executed, causes the physical machine 10 to perform a technique 150 for purposes of imparting durability to the durable transactional memory system 39. Pursuant to the technique 150, the physical machine 10 contains a transactional memory system that uses (block 154) volatile memory 36 as its primary storage; and the physical machine 10 selectively stores (block 158) data in a non-volatile memory 37 to impart durability to the durable transactional memory system 39 to allow the transactional memory system 40 to be restored to a consistent state in the event of data loss to the volatile memory 36.

Figure 3:
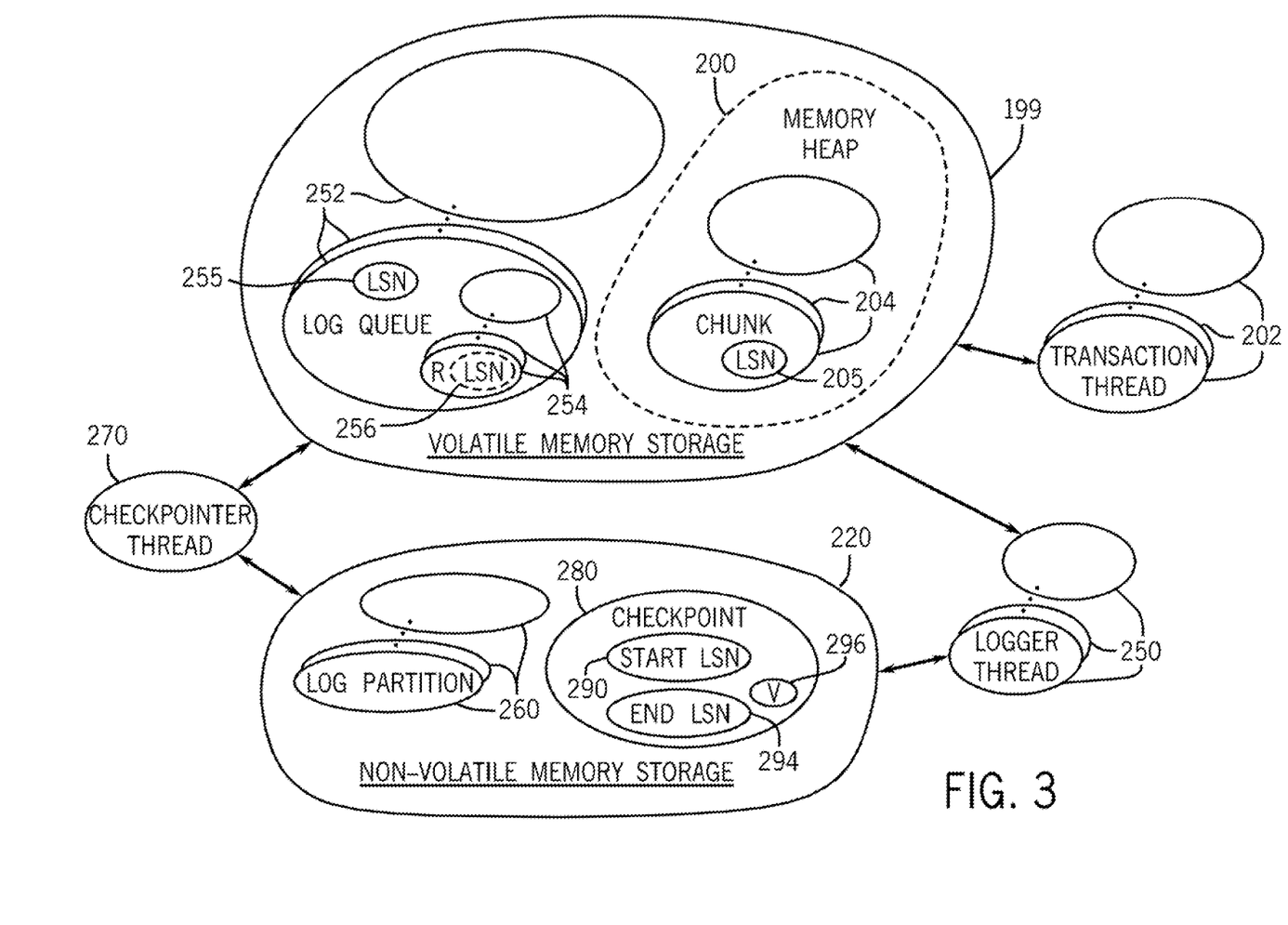
FIG. 3 is an illustration of an architecture to impart durability to a transactional memory system according to an example implementation.

As a more detailed example, FIG. 3 depicts an architecture used by the transaction durability engine 50 according to an example implementation. Referring to FIG. 1 in conjunction with FIG. 3, for this example, the durable transactional memory system 39 employs the use of a memory heap 200 in volatile memory storage 199 (storage created by the volatile memory 36, for example) as its primary storage. In other words, the memory heap 200 contains the full record of the current state of the transactional memory system 40 and application state, and as further described below, is divided by the transaction durability engine 50 into chunks 204.

As also depicted in FIGS. 1 and 3, the transaction durability engine 50 stores its data in non-volatile memory storage 220 (storage in the non-volatile memory 37, for example). More specifically, the transaction durability engine 50 stores data in the non-volatile memory storage 220 through the use of partitioned logging (i.e., records stored in log partitions 260) and checkpoints 280 to ensure that the durable transactional memory system 39 may be restored to a consistent state, in the event of that the volatile memory storage 199 experiences a data loss. The log partition 260 is, in general, a data structure in the non-volatile memory storage 220, which is associated with a particular processing entity and in which records that identify corresponding transactions are written. The checkpoint 280, in general, is a full record of the state of the volatile memory heap 200 at some point or range of points in time, such that the checkpoint 280, in conjunction with the logged transaction information provided by the records stored in the log partitions 260, may be used to recover a consistent state of the durable transactional memory system 39.

The durable transactional memory system 39 and the transaction durability engine 50 both rely on the use of logical sequence numbers (LSNs), in accordance with example implementations. The LSN defines the order of an associated transaction and is consistent with the partial order of the transactions. Collectively, the LSNs define the order in which the transactions are committed. As a non-limiting example, the LSNs may be sequential integers. However, in accordance with other example implementations, the LSNs may be any set of ordered values, in accordance with the many potential implementations.

In general, processing entities (transaction threads 202 for example) generate transactions (a given transaction being a sequence of write operations, read operations and interspersed computations, for example), and the transactional memory system 40 assigns an LSN to each transaction. The transaction durability engine 50 does not re-assign the LSNs but rather designates the LSNs in different ways, depending on how the LSN is being used. For example, as further described below, the transaction durability engine 50 designates some of these LSNs as "logger LSNs 255," which indicate the state of the log and partitioned logs, respectively, as further described below. The logger LSN is the LSN of the most recent transaction from the log queue 252 that has been written to a log partition 260 in the non-volatile memory 37. The transaction durability engine 50 also employs the use a "committed LSN," which is the minimum of all logger LSN 255 values and is the LSN of the transaction for which all preceding transaction records 254 have been written out to the non-volatile memory storage 220.

The transaction durability engine 50 also employs the use of other LSNs. In this manner, a "chunk LSN" 205 refers to the LSN of the last transaction that checkpointed an associated chunk 204. A "start LSN" 290 indicates that all previous transactions in a valid checkpoint 280 are reflected in the checkpoint 280. An "end LSN" 294 indicates the point where subsequent transactions are definitely not reflected in the checkpoint 280.

Turning now to more specific details, in accordance with some implementations, the transaction durability engine 50 includes a logger 54 (see FIG. 1), which causes the physical machine 10 to create a corresponding logger thread 250 for each processing entity that creates transactions. For the following non-limiting example, it is assumed that a logger thread is created for each transaction thread 202, and the transaction threads 202 may be associated with the executions(s) of one or multiple applications 26. After a given transaction thread 202 has completed its heap 200 updates, the transaction thread 202 enqueues a corresponding transaction record 254 of the updates it has made into an associated log queue 252 that is stored in the volatile memory storage 199. In general, each log queue 252 is associated with a given transaction thread 202 and log partition 260 (for this example); and each log queue 252 stores transaction records 254 that reflect the associated transactions that were committed to the heap 200.

Periodically, the logger thread 250 reports the committed LSN value to the transactional threads 202, which means that all transactions with LSN values less than or equal to the committed LSN value have been saved to the non-volatile memory region 220. The rate at which the committed LSN computation is made may be based on a number of various factors, such as a combination of a time threshold and the completion of a set of transaction log writes. Moreover, the transaction thread 202 informs the calling applications 26 that the corresponding transactions have been committed. It is noted that the applications 26 may or may not wait for this confirmation, depending on whether the durable transactional memory system 39 is in a synchronous or asynchronous mode operation.

More specifically, when the durable transactional memory system 39 is in the synchronous mode of operation, the system 39 confirms to a calling application or thread that a given transaction has been committed after the transaction has been stored in the volatile 36 and non-volatile 37 memories. When the durable transactional memory system 39 is in the asynchronous mode of operation, the system 39 confirms to a calling application 26 or thread that a given transaction has been committed after the transaction has been stored in the volatile memory 36 but before the transaction has been stored in the non-volatile memory 37.

Therefore, except for an event that compromises the integrity of the volatile memory 36, such as a power failure (as a non-limiting example), consistency is preserved, without incurring the delay that would be experienced by a truly synchronous system. In accordance with some implementations, in addition, the durable transactional memory system 39 provides an interface for an application 26 or thread to determine the durability of a given asynchronous transaction (i.e., the application 26/thread may use the interface to determine whether a given asynchronous transaction has been stored in the non-volatile memory 37).

In some example implementations, the logger thread 250 periodically writes out of set of transaction records 254 from the log queue 252 into a corresponding log partition 260 in a first-in first-out (FIFO) order, depending on such factors as whether the size of the queued records exceeds a size threshold or whether a certain time interval has elapsed after the records were last updated to the log partition 260. In accordance with some example implementations, the non-volatile memory storage 220 enqueues multiple such write requests from multiple logger threads 250 and writes these to update more than one log partition 260, simultaneously, or in parallel. When the new records are stored in the non-volatile memory storage 220, the non-volatile memory 37 informs the appropriate logger thread(s) 250; and the logger thread(s) 250 then update the corresponding logger LSN(s) 255 to reflect the durable LSNs for each log queue 252.

Figure 4:
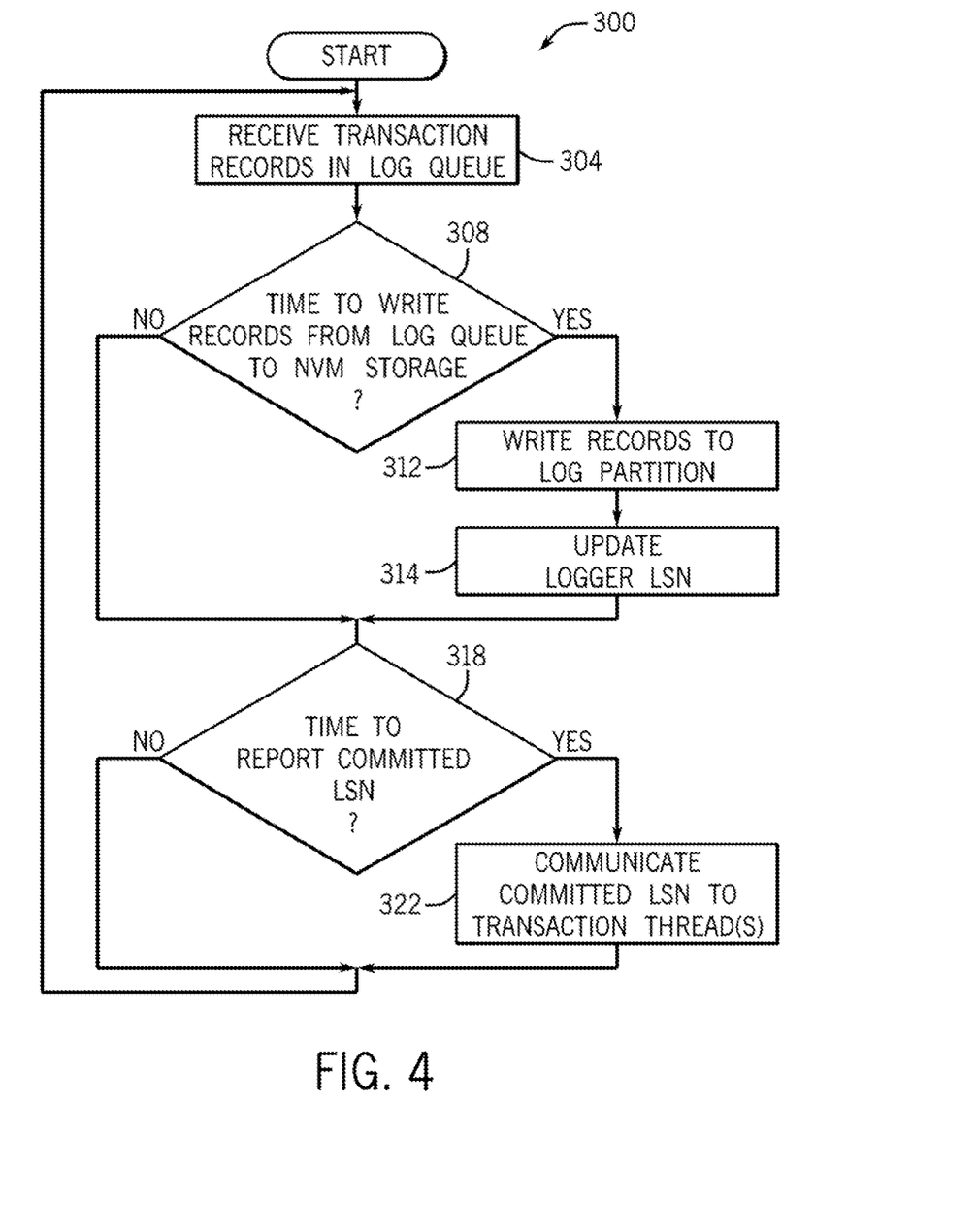
FIG. 4 is a flow diagram depicting a technique to log transaction records according to an example implementation.

Thus, referring to FIG. 4 in conjunction with FIG. 3, in accordance with some example implementations, the logger thread 250 performs a technique 300. Pursuant to the technique 300, transaction records are received into the log queue 252, pursuant to block 304. The logger thread 250 determines (diamond 308) whether it is time to write records from the log queue 252 to the log partition 260 in the non-volatile memory storage 220. If so, then the logger thread 250 writes the records to the log partition 260, pursuant to block 312 and upon completion of the write operations, updates the logger LSN, pursuant to block 314.

Control then proceeds to diamond 318, where the logger thread 250 determines (diamond 318) whether it is time to report a committed LSN. If so, then the logger thread 250 communicates the committed LSN to the corresponding transaction thread(s) 202, pursuant to block 322. Control then returns to block 304.

As a non-limiting example, the logger thread 250 may determine the committed LSN every time that a log write completes at the non-volatile memory storage 220 or if the logger thread 250 has corresponding pending log writes with an LSN greater than the last reported committed LSN and the time since the previous check exceeds a set time threshold. Alternatively, in accordance with other example implementations, the transaction memory manager 50 may cause the physical machine 10 to create a thread separate from the logger threads 250 for purposes of periodically determining the committed LSN. The communication of the newly committed LSN in either case may be reported it to all of the transaction threads 202, either through (as non-limiting examples) a message or by posting the committed LSN to a common location, which the transaction threads 202 may access via polling.

Referring to FIG. 1 in conjunction with FIG. 3, for purposes of creating the checkpoint 280, the transaction durability engine 50 includes a checkpointer 52, which when executed causes the physical machine 10 to create a corresponding checkpointer thread 270. As noted above, the checkpoint 280 is a full record of the state of the memory heap 200 at some point or range of points in time, such that the checkpoint 280, in conjunction with the records logged in the log partitions 260, may be used to recover the most recent consistent state of the durable transactional memory system 39.

It is noted that in accordance with some example implementations, the checkpoint 280 may not be a snapshot of the memory heap 200 at a given single time. Instead, in accordance with some example implementations, the checkpoint 280 reflects the chunks 204 over a range of times. In general, the checkpoint 280 is stored in the non-volatile memory storage 220 and has an associated start LSN 290, an associated end LSN 294 and may also include an associated valid flag 296.

The checkpoint 280 reflects all of the transactions with LSN less than or equal to the start LSN 290; and the checkpoint 280 reflects no transactions with an LSN greater than the end LSN 294. It is noted that the checkpoint 280 may not reflect all of the transactions with LSNs between the start LSN 290 and the end LSN 294.

In general, a given checkpoint 280 is valid if all records 254 less than or equal to the end LSN 294 are written to the log partitions 260 and all records 254 greater than the start LSN 290 remain in the log partitions 260. All records 254 that are less than or equal to the start LSN 290 may be discarded. In general, there may be multiple checkpoints 280 stored in the non-volatile memory storage 220, with always at least one valid checkpoint 280.

The checkpoint 280 may be created as follows, in accordance with some example implementations. At least one copy of the memory heap 200 exists before transactions may be run. For example, a checkpoint initialization process may simply copy the memory heap 200 to the non-volatile memory storage 220. Since no transactions have been executed, the start 290 and end 294 LSNs each have an initial value (zero and infinity, respectively, for example). After that, transactions may begin, and the checkpointer thread 270 creates a new checkpoint 280 as follows. At the beginning of the new checkpoint creation process, the checkpointer thread 270 creates an empty checkpoint stub in the non-volatile memory storage 220, with the start LSN 290 having its initial value (zero, for example), the end LSN 294 having an initial value (a maximum number or a number indicative of infinity, as non-limiting examples), and the valid flag 296 being false.

In the creation of a new checkpoint 280, a chunk 204 of the memos heap 200 is copied to a temporary buffer using a transaction, and the LSN of that transaction is set as the chunk LSN 205 for that chunk 204. The content of the temporary buffer is then copied to the non-volatile memory 37 to create a copy of the chunk 204 in the new checkpoint 280. The first chunk 204 sets the start LSN 290, and the last chunk 204 sets the end LSN 294. As the chunks 204 are copied and written to the non-volatile memory storage 220, the end LSN 294 is updated to the latest chunk LSN 204.

At the end of the copying process, the checkpointer thread 270 determines whether the checkpoint 280 is valid by verifying that all the logger LSN 255 values are equal to or greater than the determined end LSN 294, which indicates that all the updates reflected in the checkpoint 280 have been saved to a log. If not, the checkpointer thread 270 pauses until this condition no longer holds (which eventually becomes true if the logger threads 250 are not blocked). Alternatively, the checkpointer thread 270 may force the logger threads 250 to write enough of the loq queues to the log partitions 260 to ensure this conditions holds. Subsequently, the checkpointer thread 270 sets the valid flag 296 to a true state.

In accordance with example implementations, the checkpointer thread 270 may remove one or multiple old checkpoints 280 or may reuse the memory space occupied by the older checkpoint(s) 280. Log records that are older than the valid checkpoint's start LSN may also be discarded, because these records are reflected in the newly-created checkpoint 280, in accordance with some example implementations. Because older checkpoint(s) 280 are removed after the newest checkpoint 280 is verified to be valid, there is at least one valid checkpoint 280 stored in the non-volatile memory storage 220 at all times.

Figure 5:
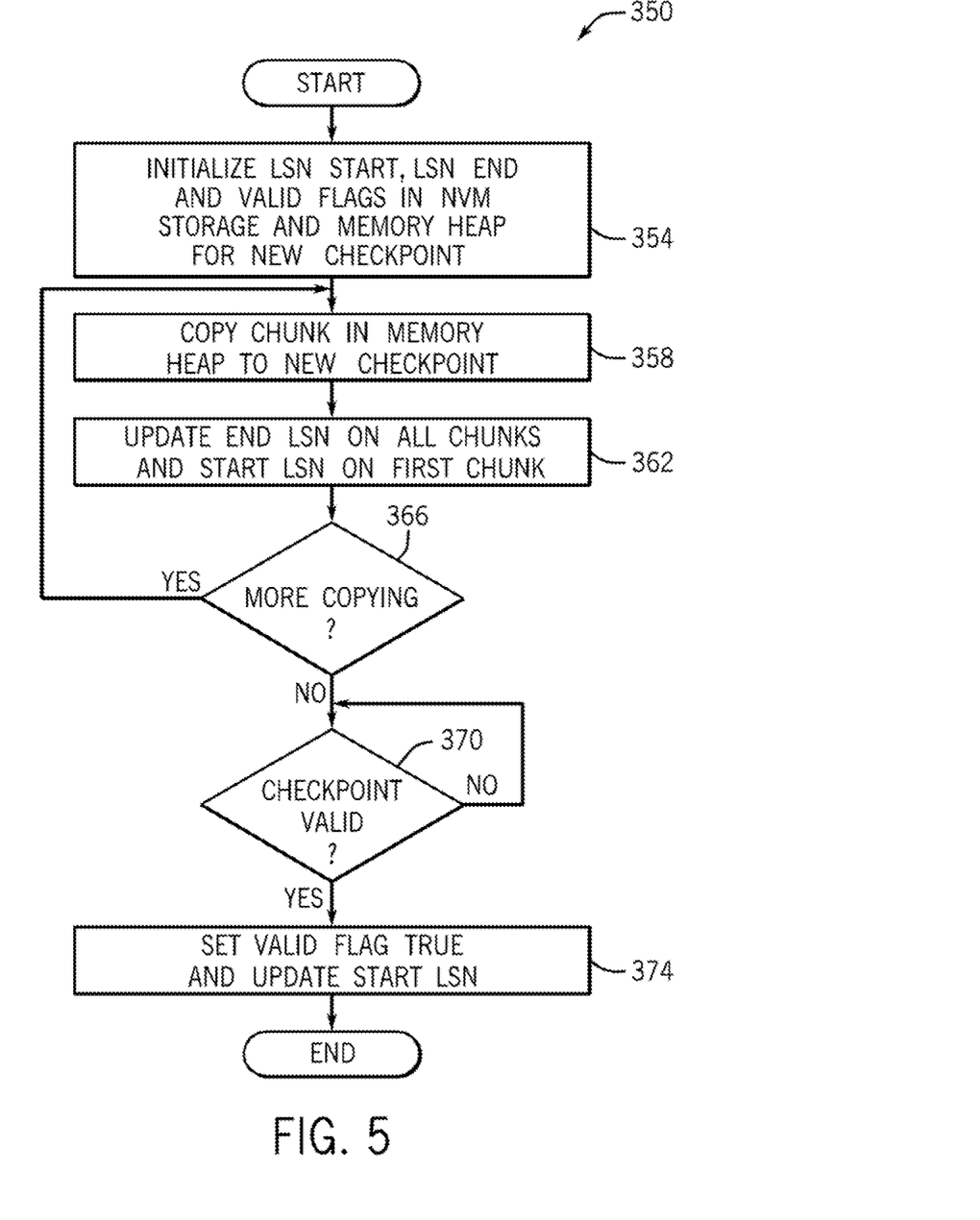
FIG. 5 is a flow diagram depicting a technique to create a checkpoint according to an example implementation.

To summarize, referring to FIG. 5 in conjunction with FIG. 3, in accordance with an example implementation, the checkpointer thread 270 may perform a technique 350. Pursuant to the technique 350, the checkpointer thread 270 initializes (block 354) the LSN start, LSN end and valid flags in the non-volatile memory storage 220 and volatile memory storage 199 for a new checkpoint 280 before copying (block 358) the chunks 204 in the memory heap 200 to the new checkpoint 280, pursuant to block 358. Subsequently, the checkpointer thread 270 updates the end LSN 294 and start LSN 290 on the first chunk in memory, pursuant to block 362.

In response to the checkpointer thread 270 determining (diamond 366) that more copying is needed, chunks 204 are continued to be copied, pursuant to block 358. Further, if more copying is to occur, the end LSN (and not the start LSN) is updated for subsequent chunks after the first, pursuant to block 362. It is noted that FIG. 5 merely schematically depicts the copying of the data for the new checkpoint 280, as the actually copying may occur in a predetermined number of iterations in a loop, may involve parallel copying, and so forth. After the copying is complete, the checkpointer thread 270 determines (diamond 370) whether the checkpoint is valid. If so, the checkpointer thread 270 sets the valid flag to true in the non-volatile memory storage 220 and updates the start and end LSNs in the non-volatile memory storage 220, pursuant to block 374.

Referring back to FIGS. 1 and 3, in accordance with some example implementations, transaction durability engine 50 includes another component, a recovery builder 58, for purposes of recovering stored transactional memory data should a failure occur (e.g., data loss due to a power failure). In this recovery, the recovery builder 58, when executed by the physical machine 10, restores a consistent state for the durable transactional memory system 39. In general, the recovery builder 58 uses the newest valid checkpoint 280 and applies the logged records in LSN order. In this manner, if the LSN of a given record is less than the chunk LSN, then the log record may be ignored for that chunk 204. After the rebuild, the memory heap 200 reflects all committed transactions. If no valid flag was stored for the checkpoints 280, the recovery builder 58 determines the validity of the checkpoints 280 by determining if the logger LSN 255 for each logger is not less than the end LSN of the checkpoint 280. The logger LSNs may be found as the last LSN of the log partition 260, because each logger thread 250 writes transaction records in the order of their LSNs.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:

storing, by a transactional memory system, transaction data in a volatile memory, wherein the volatile memory is a primary storage for the transaction data, wherein the transactional memory system instills properties of atomicity, consistency and isolation for transactions utilizing the transactional memory system, and wherein the transactions are associated with a plurality of processing entities that share a memory of the transactional memory system;

selectively storing, by a transaction durability engine, data in a non-volatile memory, wherein the selective storing allows the transactional memory system to be restored to a consistent state in an event of data loss to the volatile memory, and wherein the selective storing comprises:

copying the transaction data stored in the volatile memory into a first non-volatile memory region of the non-volatile memory;

generating a checkpoint based on the copied transaction data; and logging a record that reflects a second transaction that occurred after the generation of the checkpoint in a second non-volatile memory region of the non-volatile memory;

receiving partitioned logs from a log queue;

determining to write the partitioned logs from the log queue to the non-volatile memory;

writing the partitioned logs to the non-volatile memory; and updating a logger logical sequence number (LSN) based on writing the partitioned logs.

2. The method of claim 1, further comprising associating the copied transaction data with ordering identifiers assigned by the transactional memory system to the transactions that generated the copied transaction data.

3. The method of claim 1, wherein the second non-volatile memory region is associated with partitions, each of the partitions being associated with a different transaction generating entity.

4. The method of claim 1, wherein the checkpoint is indicative of a full record of a heap in the volatile memory used by the transactional memory system.

5. The method of claim 1, wherein the selective storing the transaction data is performed in at least one of the following memories: NAND flash memory, phase change memory, and memristor memory.

6. The method of claim 1, further comprising: in response to a data loss in the volatile memory, reconstructing transactional memory data.

7. The method of claim 1, wherein the volatile memory contains a full record of a current state of the transactional memory system and application state, and the method further comprises:

dividing, by the transaction durability engine, the volatile memory into partitioned logs; and storing the partitioned logs in the non-volatile memory.

8. The method of claim 1, wherein the logger logical sequence number (LSN) corresponds with a range of values associated with the transaction data corresponding with the partitioned logs.

9. An article comprising at least one non-transitory machine-readable storage medium storing instructions that upon execution cause a system having at least one processor to:

store, by a transactional memory system, transaction data in a volatile memory, wherein use a volatile memory is a primary storage for the transaction data, wherein the transactions are associated with a plurality of processing entities that share a memory of the transactional memory system, wherein the transactional memory system instills properties of atomicity, consistency and isolation for the transactions utilizing the transactional memory system;

selectively store, by a transaction durability engine, data in a non-volatile memory, wherein the selective storing imparts durability to the transactional memory system to allows the transactional memory system to be restored to a consistent state in an event of data loss to the volatile memory, and wherein the selective storing comprises:

copying the transaction data stored in the volatile memory into a first non-volatile memory region of the non-volatile memory;

generating a checkpoint based on the copied transaction data; and     logging a record that reflect a second transaction that occurred after the generation of the checkpoint in a second non-volatile memory region of the non-volatile memory;

receive partitioned logs from a log queue;

determine to write the partitioned logs from the log queue to the non-volatile memory;

write the partitioned logs to the non-volatile memory; and update a logger logical sequence number (LSN) based on writing the partitioned logs.

10. An apparatus comprising:

a volatile memory to store transaction data, wherein the volatile memory is a primary storage for the transaction data;

a non-volatile memory;

a transactional memory system instilling properties of atomicity, consistency and isolation for transactions utilizing the transactional memory system, wherein the transactions are associated with a plurality of processing entities that share a memory of the transactional memory system;

a transaction durability engine selectively storing data in the non-volatile memory, wherein the selective storing imparts durability to the transactional memory system to allows the transactional memory system to be restored to a consistent state in an event of data loss to the volatile memory, and wherein the selective storing comprises:

copying the transaction data stored in the volatile memory into a first non-volatile memory region of the non-volatile memory;

generating a checkpoint based on the copied transaction data; and     logging a record that reflect a second transaction that occurred after the generation of the checkpoint in a second non-volatile memory region of the non-volatile memory; wherein the apparatus further to:

receiving partitioned logs from a plurality of log queues, wherein each of the partitioned logs corresponds with one of the plurality of log queues;

determining whether to write the partitioned logs from the plurality of log queues to the non-volatile memory; and generating a notification associated with the determination of whether to write the partitioned logs.

11. The apparatus of claim 10, wherein the transactional memory system is further adapted to associate the copied transaction data with ordering identifiers assigned by the transactional memory system to the transactions that generated the copied transaction data.

12. The apparatus of claim 10, wherein the second non-volatile memory region is associated with partitions, each of the partitions being associated with a different transaction generating entity.

13. The apparatus of claim 10, wherein the checkpoint is indicative of a full record of a heap in the volatile memory used by the transactional memory system.

14. The apparatus of claim 10, wherein the non-volatile memory comprises at least one of the following memories: NAND flash memory, phase change memory and memristor memory.

15. The apparatus of claim 10, wherein the transactional memory system is further adapted to reconstruct transactional memory data in response to a data loss in the volatile memory.

16. The apparatus of claim 10, wherein the transactional memory system is further adapted to provide confirmations to threads indicating that asynchronous transactions have been stored in the non-volatile memory.

17. The apparatus of claim 10, wherein the notification is transmitted to a transaction thread.

* * * * *